US008092205B2

(12) United States Patent
Witlin et al.

(10) Patent No.: US 8,092,205 B2
(45) Date of Patent: Jan. 10, 2012

(54) MATERIAL MANUFACTURED FROM RECYCLED PLASTICS

(76) Inventors: Brian Benjamin Witlin, Moutain View, CA (US); Anne Elizabeth Fletcher, Palo Alto, CA (US); Douglas Charles Patt, Jr., Allentown, PA (US)

(*) Notice: Subject to any disclaimer, the term of this patent is extended or adjusted under 35 U.S.C. 154(b) by 1078 days.

(21) Appl. No.: 11/775,202

(22) Filed: Jul. 9, 2007

(65) Prior Publication Data

US 2008/0020221 A1   Jan. 24, 2008

Related U.S. Application Data

(60) Provisional application No. 60/931,441, filed on May 23, 2007, provisional application No. 60/819,438, filed on Jul. 7, 2006.

(51) Int. Cl.
*B29C 65/18* (2006.01)
(52) U.S. Cl. ............ 425/73; 425/89; 425/335; 425/363; 425/505; 425/508; 425/510
(58) Field of Classification Search ............... 425/73, 425/74, 75, 89, 157, 210, 335, 363, 505, 425/508, 510, 518, 520
See application file for complete search history.

(56) References Cited

U.S. PATENT DOCUMENTS

| 3,365,348 | A | * | 1/1968 | Conti ........................... 425/505 |
| 3,390,482 | A | | 7/1968 | Holtvoigt |
| 3,432,374 | A | * | 3/1969 | Packard et al. ............... 425/520 |
| 3,530,029 | A | | 9/1970 | Lemelson |
| 3,775,217 | A | * | 11/1973 | Blake et al. ..................... 264/83 |
| 5,372,765 | A | | 12/1994 | Chen et al. |
| 5,454,704 | A | * | 10/1995 | Kaufmann et al. ........... 425/210 |
| 5,807,021 | A | | 9/1998 | Aaron |
| 6,494,390 | B1 | | 12/2002 | Khait et al. |
| 6,800,162 | B2 | | 10/2004 | Kannankeril et al. |

* cited by examiner

Primary Examiner — James Mackey
(74) Attorney, Agent, or Firm — Peters Verny, LLP

(57) ABSTRACT

Systems and methods of generating a recycled output are disclosed. This recycled output may include a fabric produced by fusing reclaimed plastic bags. The reclaimed plastic bags are fused together using a material manufacturing system. This system is typically configured to heat the plastic bags to a temperature wherein the plastic bags fuse together but do completely melt. Some embodiments include the addition of different types of plastic or non-plastic materials to the recycled output. Also disclosed are systems and methods of controlling textures and patterns within the recycled output.

20 Claims, 16 Drawing Sheets

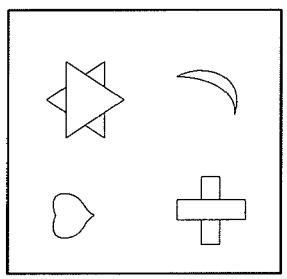
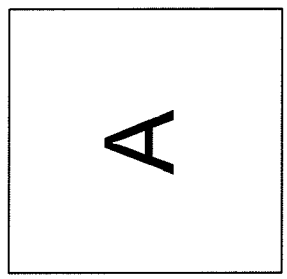
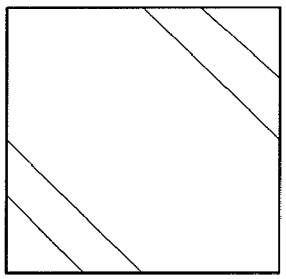
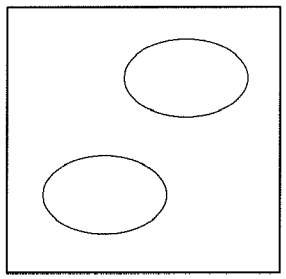
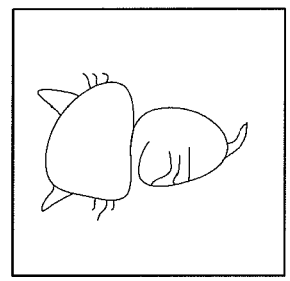
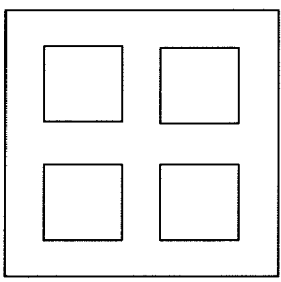
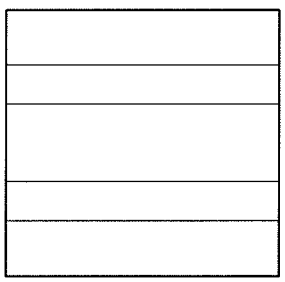
FIG. 5

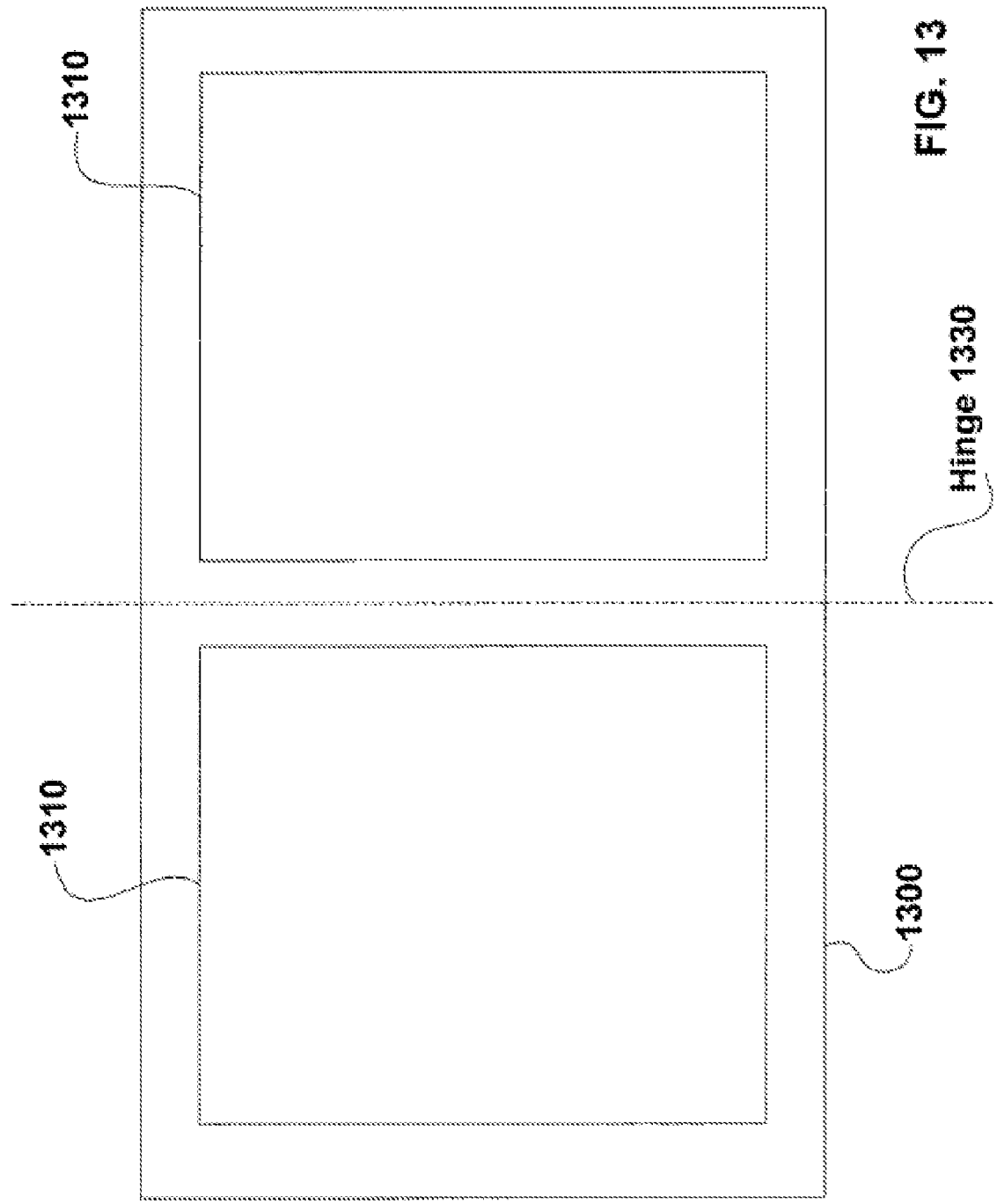

MATERIAL MANUFACTURED FROM RECYCLED PLASTICS

CROSS-REFERENCE TO RELATED APPLICATIONS

This application claims benefit and priority of U.S. Provisional Patent Application 60/819,438 filed Jul. 7, 2006 and entitled "Material Created from Heat Fusing Reclaimed Sheets of Plastic," and U.S. Provisional Patent Application 60/931,441 filed May 23, 2007 and entitled "Method of Manufacturing Material Created from Heat Fusing Plastic bags." The above provisional patent applications are hereby incorporated herein by reference.

BACKGROUND OF THE INVENTION

1. Field of the Invention

The present invention relates to methods of manufacturing materials from recycled plastic and the materials produced thereby.

2. Related Art

Plastic includes a variety of synthetic and semi-synthetic materials. They are typically composed of organic polymers and may contain other substances to achieve desired characteristics. There are also some natural polymers generally considered to be "plastics." Examples of plastics include High Density Polyethylene (HDPE), Low Density Polyethylene (LDPE), Polypropylene (PP), Polyethylene Terephthalate (PET), Polyvinyl Chloride (PVC), and Polystyrene (PS).

Plastics may be sorted according to their resin identification codes and recycled. Recycling methods include taking scrap or waste plastics, reprocessing them and turning them into useful products. One relevant reprocessing method that can be applied to a large family of plastic material is called heat compression. In this method, the plastic material is liquefied while spinning in a large drum. The resulting liquefied plastic is then pumped into casting molds and re-made into a new useful material. This process, however, is not energy efficient. Plastic recycling in general can be expensive due to the costs associated with running the heat compression machinery and the work required to sort and reprocessing various plastic materials. The presence of additives, dyes and fillers in plastic can also complicate the recycling of plastics. For these reasons and others, there is a need for improved systems and methods of plastic recycling.

SUMMARY OF THE INVENTION

Various embodiments of the invention include recycling plastic into useful materials through a process of heat fusion. The plastic is heated so as to fuse with adjacent plastic or other material. The plastic may include LDPE, HDPE, other plastics discussed herein, and/or the like. For example, in some embodiments, the plastic includes LDPE plastic bags such as those commonly used as shopping or trash bags.

The plastic is processed at a temperature at which it can flow to create mechanical bonds with other plastic and/or non-plastic material. The plastic need not be heated to a temperature sufficient to liquefy all of the plastic. For example, in some embodiments, part, e.g., the surface, but not all of a plastic is liquefied during the fusing process. In other embodiments, the plastic is maintained below a temperature required to liquefy the plastic. The plastic may be fused with plastic of the same type, plastic of a different type, and/or non-plastic materials.

The plastic may be processed using rollers, a press or a mold. For example, in some embodiments, plastic bags are guided between a set of rollers. These rollers are configured to cause layers of the plastic bags to fuse with each other by heating and/or compressing the bags. The result of fusing the plastic bags can be a recycled fabric. In another example, plastic bags are pressed within a mold in order to form a three dimensional device.

Various embodiments of the invention include controlling a surface finish of a recycling output. For example, in some embodiments, one or more temperatures of the plastic are manipulated to generate a desired surface texture. In some embodiments, a desired surface texture of the recycling output is generated by having a surface texturing material in contact with the plastic during or following the fusing process. In some embodiments, this surface texturing material is part of a roller, press or mold. In some embodiments, this surface texturing material is placed between the plastic and a roller, press or mold.

Various embodiments of the invention comprise including non-plastic materials in the recycling output. These non-plastic materials may be configured to add texture, color, ornamentation, or other functionality to the recycling output. For example, the non-plastic materials may include plant materials, different types of plastic, cloth, metals, plant materials, electronic circuits, a light source, a power source, air, and/or the like. Other examples of non-plastic materials are discussed elsewhere herein. The non-plastic materials may be fused or bonded to the recycled plastic. For example, in some embodiments, cotton cloth is bonded to one side of the recycled plastic. In some embodiments, the non-plastic material is disposed between layers of recycled plastic. For example, in some embodiments, plant materials (stalks, dried flowers, etc.) are placed between the plastic prior to fusing such that the plant materials are encapsulated within the recycling output after fusing. Air may be included in the recycling output by injection during the fusing process or by including bubble wrap with the plastic to be fused. Various embodiments of the invention include a system comprising a first roller set configured to receive plastic bags and to fuse the plastic bags into a recycled fabric while keeping at least part of the plastic bags below a melting temperature of the plastic bags, a first feeder configured to receive the plastic bags and to feed the plastic bags into the first roller set, and a controller configured to control a temperature or pressure of the first roller set.

Various embodiments of the invention include a system comprising a first side comprising a first press surface and a first heater, a second side comprising a second press surface and a second heater, a temperature controller configured to control a first temperature of the first press surface and a temperature of the second press surface, and a press controller configured to press the first press surface toward the second press surface for a time sufficient to fuse plastic bags into a recycled fabric while keeping at least part of the plastic bags below a melting temperature of the plastic bags.

Various embodiments of the invention include a method comprising spreading plastic bags in multiple layers over an area, placing a first separation material between the spread plastic bags and a first roller set at least part of the first roller set being at a temperature between 200 and 300 degrees Celsius, feeding the spread plastic bags into the first roller set using a mechanical feeder, fusing the plastic bags using the first roller set to generate a recycled fabric while maintaining at least part of the plastic bags at a temperature below a melting temperature of the plastic bags, and removing the first separation material from the recycled fabric.

Various embodiments of the invention include a fabric manufactured using the methods disclosed herein.

Various embodiments of the invention include a fabric comprising a plurality of plastic bags fused together at a temperature below 280 degrees Celsius, a first surface texture, and a second surface texture different than the first surface texture, the difference between the first surface texture and the second surface texture generated by applying a temperature gradient to the plurality of plastic bags or by using different separation materials.

Various embodiments of the invention include a method comprising placing cloth in a material manufacturing system, placing plastic adjacent to the cloth, fusing the plastic to the cloth so as to change a texture of the cloth, the change in texture resulting in a pattern.

Various embodiments of the invention include a fabric comprising a non-plastic material, and a recycled material formed by fusing plastic bags, the recycled material being fused to the non-plastic material.

Various embodiments of the invention include a fabric comprising a non-plastic material, and a recycled material formed by fusing plastic bags, the non-plastic material being disposed between the plastic bags.

Various embodiments of the invention include a fabric comprising plastic bags fused together, and bubble wrap fused to the plastic bags.

Various embodiments of the invention includes materials manufactured using the methods and systems described herein. These materials can include clothing, bags, waterproof covers, fabrics, shoes, other items discussed herein, and/or the like.

BRIEF DESCRIPTION OF THE DRAWINGS

FIG. 5 illustrates exemplary patterns within a recycled output, according to various embodiments of the invention.

FIG. 13 is a block diagram of a fabric including regions of different thickness, according to various embodiments of the invention.

DETAILED DESCRIPTION

Figure 1:
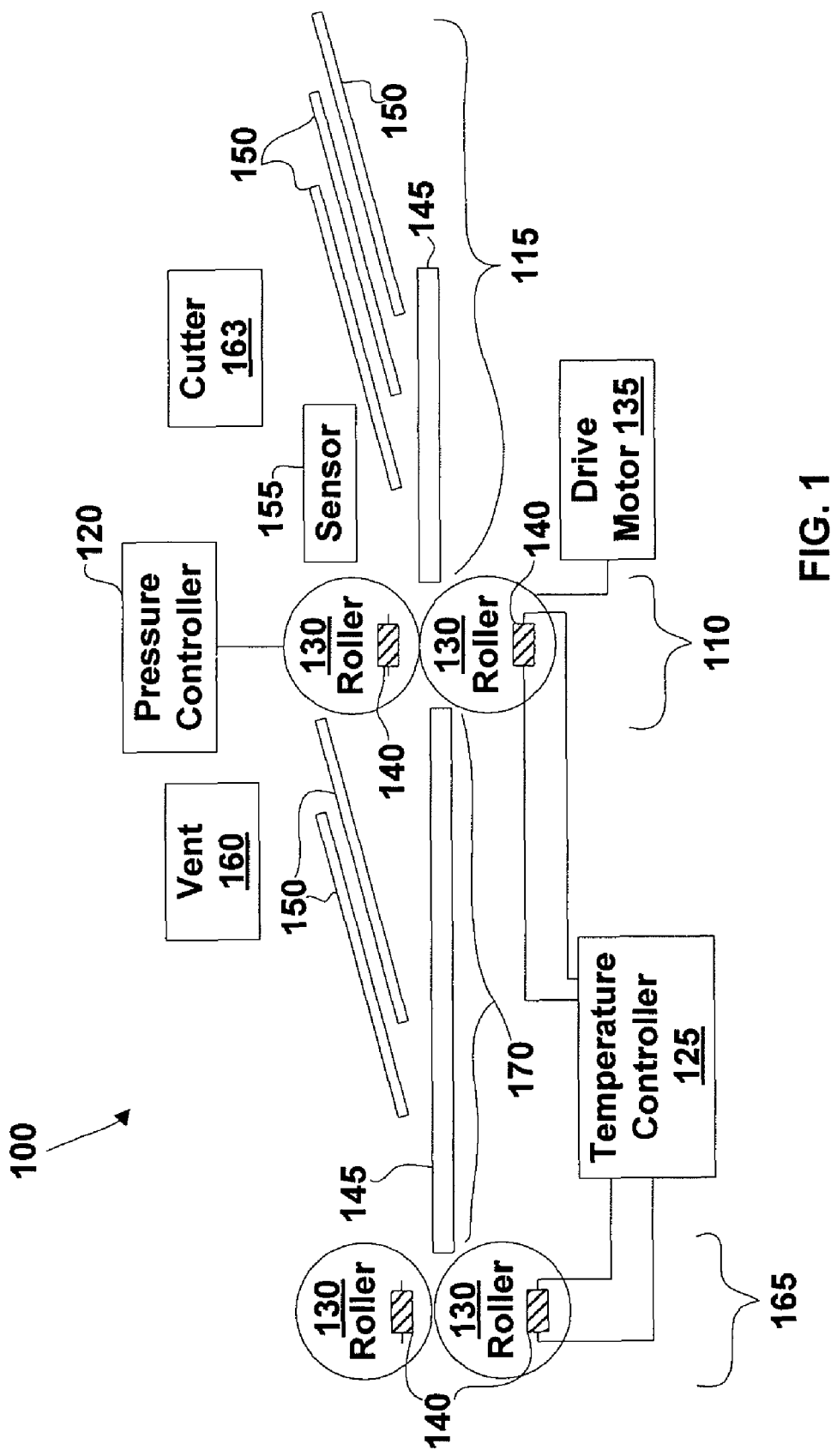
FIG. 1 illustrates a material manufacturing system, according to various embodiments of the invention.

Typical embodiments of the invention include generating recycled output such as fabrics or molded pieces from reclaimed plastics. The recycled output is generated by applying heat and/or pressure to plastics such as used or waste plastic bags. In various embodiments, the heat and/or pressure is applied using rollers, a press, a compression mold, a blow mold, and/or the like. For example, sorted, washed and dried plastic bags may be first rolled into a recycled fabric and then fused into a non-plastic material using a press. Both the recycled fabric and the output of the press are considered recycled output even when the non-plastic material is not recycled. The plastic bags may include HDPE, LDPE, cellulose based plastics, and/or the like. The recycled output can be more rigid than the original material. The ratio of starting materials can be selected to control rigidity. For example, a larger ratio of HDPE to LDPE results in a more rigid output.

In some embodiments, a texture of the recycled output is selected and then generated using appropriate fusing conditions. The texture of the recycled output includes the feel, smoothness, roughness, compressibility, flexibility, thickness, and/or the like of the recycled output. Texture can be controlled by fusing the plastic while in contact with another material that imparts its texture to the recycled output. For example, a smooth texture is generated by placing plastic bags between smooth sheets of metal while fusing, a rougher texture is generated by placing the plastic bags between sheets of silk, and an even rougher texture is generated by placing the plastic bags between burlap.

The texture can also be generated using a temperature profile. This temperature profile can be temporal and or spatial. For example, if a first side of the recycled output is allowed to cool at a different rate than a second side, then different rates of contraction will result in a texture. In another example, if one side of the recycled output is heated to a different temperature the first and second sides may have a different texture.

Texture can also be generated by including additional materials in the recycled output. For example, including bubble wrap or injecting air can result in a fabric filled with air pockets. Adding a material such as plastic beads, glass spheres, ball bearings, liquids, or many other possibilities can also result in different textures. Further examples of these additional materials are discussed elsewhere herein.

Texture can also be generated by using different amounts of plastics. For example, one part of a fabric may include four layers of plastic bags while another part of the fabric may include 8 layers of plastic bags. These differences in the number of layers can be generated by cutting some of the layers. The use of different numbers of layers is optionally used to generate folding points or patterns within a fabric.

Patterns include geometric shapes or images. For example, a pattern may include a series of diamonds, flower shapes, alphanumeric symbols, other symbols, lines, or the like. A pattern may be distinguished by differences in color or texture between areas. For example, the outline of a tree leaf may be cut out of a red bag and the leaf or outline included in a fabric made with white plastic bags.

The generation of recycled output can be manual and/or automatic. For example, plastic bags can be laid out by hand and then automatically fused. As is further described herein, in some embodiments an automated system is configured to layout plastic bags, add non-plastic materials, and automatically fuse the laid out bags.

FIG. 1 illustrates a side view of a Material Manufacturing System 100, according to various embodiments of the invention. Material Manufacturing System 100 includes at least a First Roller Set 110, a First Feeder 115, and either a Pressure Controller 120 or a Temperature Controller 125.

First Rollers Set 110 is typically configured to receive plastic bags, or other plastic, and to fuse the received plastic into a recycled output while keeping all or at least part of the plastic bags below a melting temperature of the plastic. In various embodiments, Roller Set 100 includes one, two, three or more Rollers 130. Rollers 130 are optionally driven by a Drive Motor 135. Alternatively, Rollers 130 may be configured to rotate freely and, thus, rotate when material is pushed or pulled between them.

Rollers are typically heated using a Heater 140. Heater 140 may include an infrared heater, a resistive heater, an ultrasonic heater, or the like. For example, in some embodiments, Heater 140 is a resistive heater configured to receive a current from Temperature Controller 125. Material Manufacturing System 100 optionally includes further unheated drive rollers.

Figure 2B:
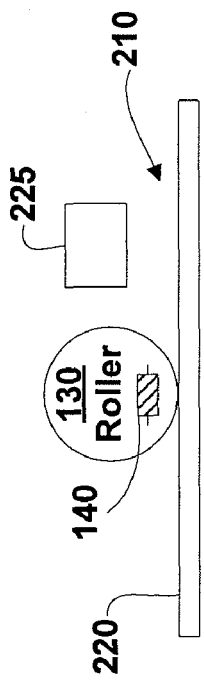
FIGS. 2A-2F illustrate alternative roller configurations, according to various embodiments of the invention.
Figure 2D:
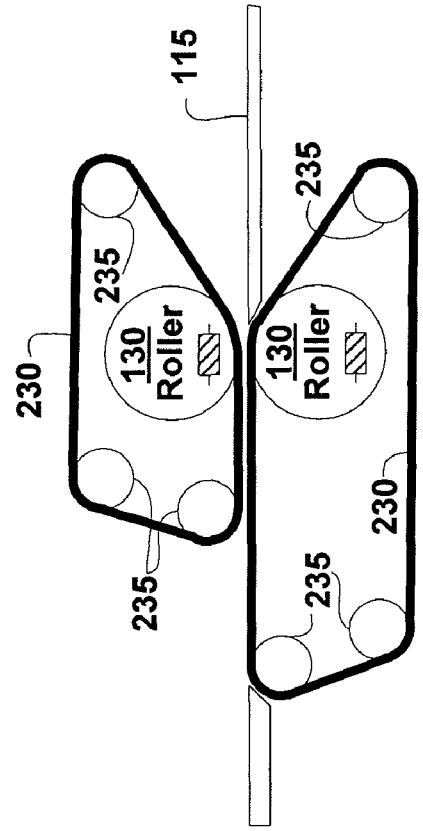
Figure 2A:
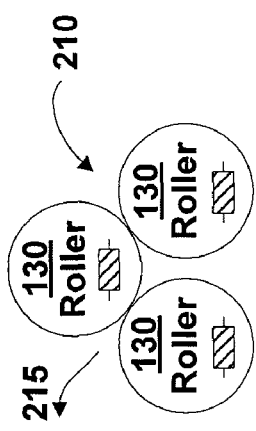

FIGS. 2A-2F illustrate various alternative configurations of First Roller Set 110. FIG. 2A illustrates a set including three Rollers 130. Plastic is introduced into the First Roller Set 100 as indicated by the Arrow 210 and recycled output comes out of the First Roller Set 100 as indicated by the Arrow 215. This embodiment of First Roller Set 110 optionally includes guides (not shown) configured to help guide the plastic between Rollers 130. In various embodiments, First Roller Set 110 includes four, five, six or more Rollers 130. The use of more rollers can allow greater feed rates at a given temperature.

FIG. 2B illustrates an embodiment of First Roller Set 110 including one Roller 130. In these embodiments, plastic is introduced as indicated by the Arrow 210. The plastic is fused between the Roller 130 and a Non-roller Surface 220. The Roller 130 may rotate in a fixed position and the Non-roller Surface 220 may move, the Non-Roller Surface may be fixed in position while the Roller 130 rolls, or both the Non-roller Surface 220 and the Roller 130 may change position. Non-roller Surface 220 may be flat or curved and is optionally heated. FIG. 2B further illustrates a non-contact Heater 225. Heater 225 is configured to heat the plastic and may include an infrared source, a stream of hot air, radiation source, or the like. Heater 225 is optionally configured to heat the plastic prior to fusing, or to heat the recycled output. To heat the recycled output, Heater 225 is disposed after the First Roller set 110. Heater 225 can be included in combination with any of the embodiments of Material Manufacturing Systems 100 described herein. Some embodiments include more than one Heater 225.

Some embodiments include a cooling device (not shown) configured to cool part of the recycled output. This cooling device may, for example, be configured to blow cool air on part of the recycled output in order to create a temperature differential between parts of the recycled output.

Figure 2C:
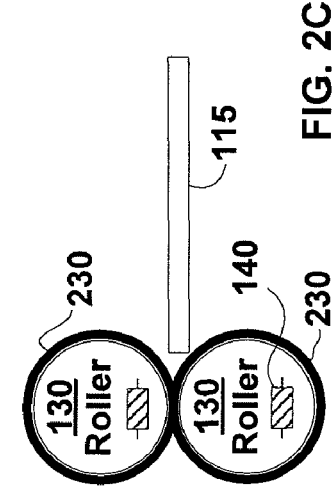

FIG. 2C illustrates an embodiment of Rollers 130 including an optional Separation Material 230. Separation Material 230 is typically configured to facilitate the release of the fused recycled output from the Material Manufacturing System 100 and specifically from Roller 130. As is discussed elsewhere herein, Separation Material 230 may be selected in order to generate a desired texture within the recycled output. Separation Material 230 may include, for example, nylon, metal foil, cloths such as cotton, linen and silk, paper, vinyl, burlap, sandblasted material, oil, silicone, metal having a non-stick coating, ceramic, or oiled material. In some embodiments, Separation Material 230 includes more than one different material each configured to produce a different texture in the recycled output. For example, if a smooth and a course material are both used in different areas of Roller 130, then the resulting recycled output will have corresponding areas of differing texture. These areas may be disposed to form a pattern. In some embodiments, Rollers 130 include a coating of silicon configured to function as Separation Material 230.

FIG. 2D illustrates an embodiment of Rollers 130 where Separation Material 230 is not attached to Rollers 130. Instead, Separation Material 230 is conveyed around a set of Wheels 235. Wheels 235 act as separators to separate Separation Material 230 from the recycled output. Shapes other than wheels, such as wedges or blades, can be used as separators. In the embodiments illustrated by FIG. 2D, Separation Material 230 is passed between Rollers 130 more than once. Wheels 235 are configured to gather Separation Material 230 for further use. In some embodiments, Wheels 235 collect Separation Material 230, for example in a roll, which may or may not be reused. In some embodiments, Separation Material 230 is passed through First Roller Set 110 in a loop, as illustrated in FIG. 2D. In some embodiments, the Separation Material 230 is cleaned using a cleaner (not shown) between uses. This cleaner can include water jets, solvents, heaters, surfactants, scrubbers, and/or the like.

FIG. 2D also illustrates an example of removing Separation Material 230 from different sides of the recycled output at different times. Removal of Separation Material 230 at various times is optionally used to control texture and/or generate patterns in the recycled output. In some embodiments, the removal of Separation Material 230 affects the rate of cooling of part of the recycled output. This cooling rate can be one of the factors effecting texture. In some embodiments, the removal of Separation Material 230 affects a rate of shrinkage of part of the recycled output. The Separation Material 230 removed at different times can be on the same or different sides of the recycled output. By removing Separation Material 230 on the same side of the recycled output at different times patterns can be generated. In various embodiments, the removal material is removed at lease 3, 5, 7, 10 or 20 seconds after fusing the plastic bags.

Figure 2F:
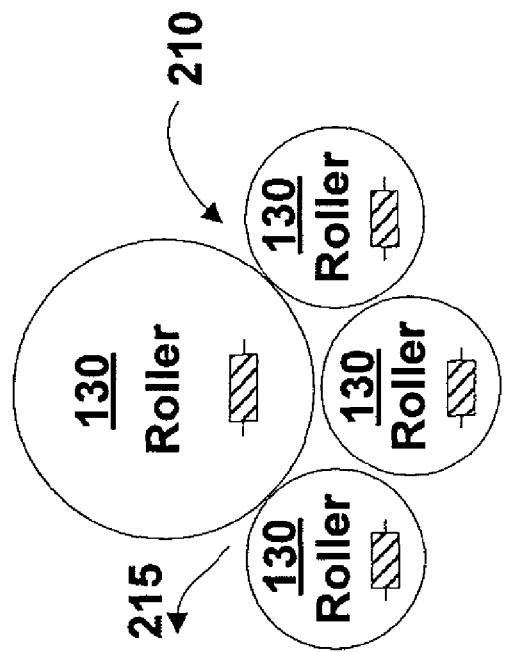
Figure 2E:
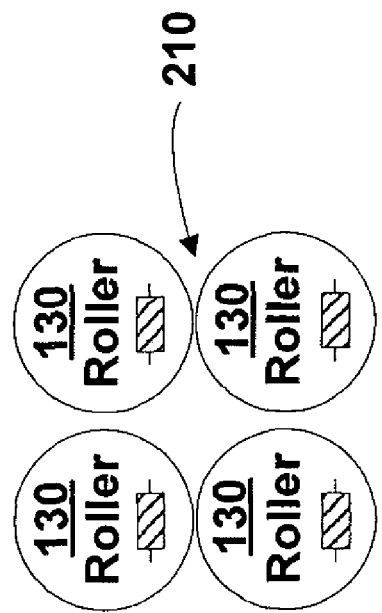

FIGS. 2E and 2F illustrate embodiments of First Roller Set 110 including four of Roller 130. The embodiments illustrated in FIG. 2F may be used to provide greater contact time between the plastic bags and at least one of Roller 130. In these embodiments, one of Roller 130 is larger than another Roller 130.

Referring again to FIG. 1, First Feeder 115 is configured to feed plastic, such as plastic bags, into First Roller Set 110. First Feeder typically includes a Conveyor 145 to receive the plastic bags. Conveyor 145 may be mechanized or may be a gravity operated ramp. For example, in some embodiments, Conveyor 145 includes a conveyor belt configured to move material to First Roller Set 110 at a desired rate. In various embodiments, this rate is at least 0.5, 1.0, 2.0, 2.5, or 4.0 meters per minute. In some embodiments, a feed rate of 80-100 feet per hour is used in a temperature range of 350-415 degrees Fahrenheit.

In various embodiments, the thickness of the recycling output is greater than 0.005, 0.007, 0.014, 0.022, 0.034 inches. In some embodiments, this thickness is between 0.014 and 0.034 inches. In some embodiments, four plastic bags (eight layers of plastic) will result in a thickness of approximately 0.013 inches, 8 plastic bags will result in a thickness of approximately 0.019 inches, and 12 plastic bags will result in a thickness of approximately 0.035 inches.

In some embodiments, plastic bags are laid out on Conveyor 145 by hand. In other embodiments, plastic bags are provided to Conveyor 145 by a Material Source 150. Material Source 150 is configured to deposit a layer of plastic bags or other material on Conveyor 145. Material Source 150 optionally includes a spreader configured to spread plastic bags out. The spreader can include brushes, gripping devices, narrow openings, air jets, and/or the like. First Feeder 115 can include one, two, three or more of Material Source 150. For example, in some embodiments, First Feeder 115 includes three Material Source 150 each configured to add a layer of plastic bags to Conveyor 145.

In some embodiments, Material Source 150 is configured to add a non-plastic material and/or a plastic of a type different from the plastic bags. Depending of the order of which material is added to Conveyor 145, the non-plastic material or the different plastic is disposed between layers of plastic bags or on one side (e.g., on top) of the plastic bags. In some embodiments, the different plastic includes a same plastic type in a different form. For example, in some embodiments, a scrim including a HDPE core and a LDPE outer layer is added to plastic bags. One such scrim is the CLAF® scrim manufactured by Atlanta Nisseki CLAF, Inc. of Kennesaw, Ga. USA. A wide variety of non-plastic materials may be added using Material Source 150 and, thus, included in the recycled output. For example, in various embodiments, the non-plastic materials or materials of a different plastic type include: cloth, leather, metal, plant material, wood, paper, photographs, trinkets, jewelry, electronics, integrated circuits, solar cells, lighting, wire, mesh, natural or synthetic fibers, liquid, gases, bubble wrap, insects, minerals (e.g., mica, diamond, semi-precious stones, coral), paint, mechanical devices, sheet metal, chemicals, polyester, nylon, vinyl, Velcro, buttons, zippers, rivets, ink, dye, and/or the like. In some embodiments, the non-plastic material is configured to act as a strengthener to achieve additional rigidity, a mechanical property, or a favorable shaping capability. For example, the use of chicken wire as the non-plastic material results is a fabric that can be shaped. In some embodiments, non-plastic materials or materials of a different plastic type are deposited on one of Roller 130 and are transferred to the recycled output when this Roller 130 comes in contact with the plastic bags.

First Feeder 115 optionally includes one or more Sensor 155. Sensor 155 can be configured to, for example, detected a color of plastic bags, detect how many layers of plastic bags are deposited on Conveyor 145, detect a temperature of plastic bags, detect images on plastic bags, and/or the like. For example, Sensor 155 may include a calorimeter, spectrograph, camera, ultrasonic sensor, and/or the like. In some embodiments, Sensor 155 is configured to detect specific symbols (e.g., trademarks) within plastic bags and remove or modify those symbols prior to inclusion in the recycled output. In some embodiments, Sensor 155 is configured to assure that a minimum number of layers of plastic bags are included in the recycled output. Sensor 155 may be disposed at a variety of points within Material Manufacturing System 100. For example, Sensor 155 may be used to analyze plastic bags prior to Material Source 150. Sensor 155 maybe disposed between instances of Material Source 150.

First Feeder 115 optionally further includes a Cutter 163 configured to cut plastic bags. In some embodiments, Cutter 163 is configured to cut patterns into the plastic bags. For example, Cutter 163 may be configured to cut symbols, images, patterns, and/or the like. The symbols can include lines, curves, hearts, diamonds, numbers, letters, logos, plant leaves, icons, and/or the like. Cutter 163 is optionally configured to cut plastic bags delivered by one or two of Material Source 150 but not by other Material Source 150. In some embodiments, Cutter 163 is configured to shred plastic bags, e.g., in a cross-cut or linear manner, or to trim the plastic bags before or after fusing. In some embodiments, Sensor 155 and Cutter 163 are configured to operate in a coordinated manner such that symbols identified by Sensor 155 are cut by Cutter 163. Cutter 163 can be configured to cut plastic bags on Material Source 150, on Conveyor 145, and/or to cut the recycled output after fusing of the plastic bags. Cutter 163 may include a laser, a die, a blade, and/or the like.

Pressure Controller 120 is configured to control a pressure applied by Roller 130 to the plastic bags during fusing. In various embodiments, this pressure is between 2 and 20 psi. In some embodiments, Pressure Controller 120 includes merely an adjustable fastener such as a bolt. In various embodiments, Pressure Controller 120 includes a spring, pneumatic device, and/or electrical mechanical device. Pressure Controller 120 is optionally adjustable during the generation of recycled output. By changing pressure, characteristics, such as texture and thickness, of the recycled output can be changed. A sufficient pressure enables the fusing process to occur while maintaining all or most of the plastic below its melting point.

Temperature Controller 125 is configured to control the temperature of one or more of Roller 130 and/or Non-roller surface 220. In some embodiments, Temperature Controller merely includes a current source configured to provide current to one or more of the various Heater 140. In some embodiments, Temperature Controller 125 includes a programmable temperature target, one or more temperature sensor, proportional-integral-derivative (PID) logic, fuzzy logic, and/or the like. Temperature Controller 125 is typically configured to control the temperature of Roller 130 such that the plastic bags fuse together while keeping at least part of the plastic bags below a melting temperature of the plastic bags. Optionally, each of the plastic bags that enter First Roller Set 110 melt to at least some extent. For example, in some embodiments, every one of the plastic bags is raised to a temperature wherein a part of their material can flow and fuse with neighboring bags or other material. In various embodiments, Temperature Controller 125 is configured to heat Roller 130 to between approximately 160 and 300 degrees Celsius, and more particularly between 190 and 210 degrees Celsius. In various embodiments, temperatures above 180, 190, 195, 200, 205, 210, 220, 230, 240 and 250 degrees Celsius are used. In various embodiments, temperatures below 275, 260, 250, 240 and 220 degrees Celsius are used. The temperature can be below the temperature at which the plastic would change from a solid to a liquid state. Temperature Controller 125 is optionally configured to heat different Roller 130 to different temperatures. For example, Rollers 130 of First Roller Set 110 may be at different temperatures during fusing of plastic bags. This results in a different temperature profile for different sides of the recycled output. In various embodiments, the temperature difference is greater than or equal to 5, 8, 10, 15, 20 or 30 degrees Celsius. In various embodiments, the temperature difference is less than 50, 30, 25, 20, 15, 10 or 5 degrees Celsius.

Material Manufacturing System 100 optionally includes a Vent 160 configured to remove air from the vicinity of First Roller Set 110. Vent 160 includes fans, blowers, ducting, filters, and/or the like.

Material Manufacturing System 100 optionally further includes a Second Roller Set 165 configured to further process the recycled output of First Roller Set 165. A Second Feeder 170 is optionally used to convey the recycled output between First Roller Set 115 and Second Roller Set 170. In various embodiments, Second Roller Set 165 is configured for fusing a non-plastic material or a different plastic material to the recycled output, for forming a seam between two recycled fabrics, to fuse two recycled outputs together, and/or the like. For example, in some embodiments finished or unfinished edges of recycled fabric are overlapped and then introduced into Second Roller Set 165. Within Second Roller Set 165, these edges are fused to form a seamless fabric. In some embodiments, the edges are also stitched together using a stitcher (not shown) between First Roller Set 115 and Second Roller Set 165. This stitching may be accomplished using typical thread or a plastic based thread that can at least partially melt during the fusing process. Unfinished edges can be produced by, for example, having part of the plastic bags miss First Roller Set 115. These unfinished edges may be interleaved with each other before forming a seam in Second Roller Set 165. Three, four or more roller sets are included in alternative embodiments.

Second Feeder System 170 optionally includes one or more Material Sources 150 configured to add additional material to the recycled output prior to fusing in Second Roller Set 165. This additional material may include previously prepared recycled output, and/or the various non-plastic or different plastic materials discussed elsewhere herein. For example, in some embodiments, Second Roller Set 165 and Second Feeder 170 are configured to seal a non-plastic material between two layers of recycled fabric. As with First Feeder 115, Second Feeder 170 may include instances of Sensor 155 and/or Cutter 163. For example, in some embodiments, Sensor 155 is configured to detect thin points in the recycled fabric and use Second Feeder 170 to add further plastic bags at those points prior to Second Roller Set 165.

Figure 3:
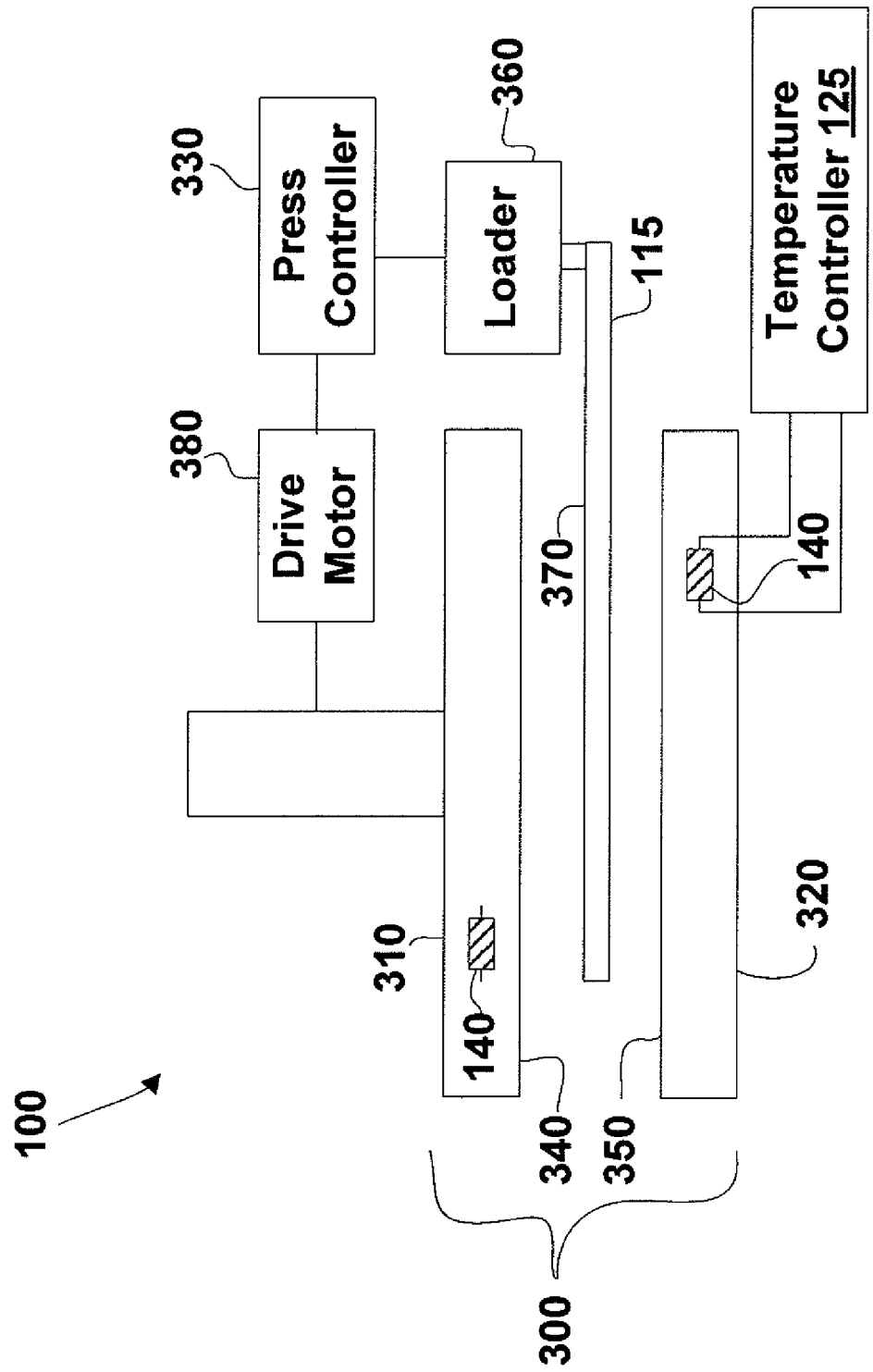
FIG. 3 illustrates an alternative material manufacturing system, according to various embodiments of the invention.

FIG. 3 illustrates alternative embodiments of Material Manufacturing System 100. These embodiments include a Press 300 consisting of a First Side 310, a Second Side 320, Temperature Controller 125, and a Press Controller 330. First Side 310 and Second Side 320 include a First Press Surface 340 and Second Press Surface 350, respectively. First Press Surface 340 and Second Press Surface 350 are configured to press plastic materials, such as plastic bags to form a recycled output. First Side 310 and/or Second Side 320 each also optionally include an instance of Heater 140. Temperature Controller 125 is configured to control a temperature of First Press Surface 340 and a temperature of the Second Press Surface 350. These temperatures may be the same or different. For example, in various embodiments, these temperatures are at least 3, 5, 10, 15 or 20 degrees Celsius apart. In various embodiments, the temperature difference is less than 50, 30, 25, 20, 15, 10 or 5 degrees Celsius.

In the embodiments illustrated in FIG. 3, First Feeder 115 includes a Loader 360 having one or more Manipulator 370. Loader 360 is configured to load plastic, such as plastic bags, onto Second Press Surface 350. For example, Manipulator 370 may be configured for picking up plastic bags and placing them on Second Press Surface 350. Manipulator 370 can include mechanical grabbers or suction devices to pick up the plastic bags and resulting recycled output. Manipulator 370 is optionally configured to automatically load materials other than plastic bags, e.g., non-plastic materials or plastics of a different type, onto Second Surface 350. Sensor 115 may be used to monitor this loading. In some embodiments, Manipulator 370 is configured to place a separation material between First Press Surface 340 and Second Press Surface 350. First Press Surface 340 and/or Second Press Surface 350 are optionally embossed with a pattern configured to create a corresponding pattern in the recycled output.

First Side 310 is optionally moved using a Drive Motor 380 configured to move First Side 310 toward and away from Second Side 320. Drive Motor 380 and optionally Loader 360 are each controlled by Press Controller 330. Press Controller 330 is configured to press First Press Surface 340 toward Second Press Surface 350 for a time and pressure sufficient to fuse plastic bags into a recycled fabric while keeping at least part of the plastic bags below a melting point of the plastic bags. Press Controller 330 is optionally programmable and optionally includes an electronic timing circuit.

Figure 4:
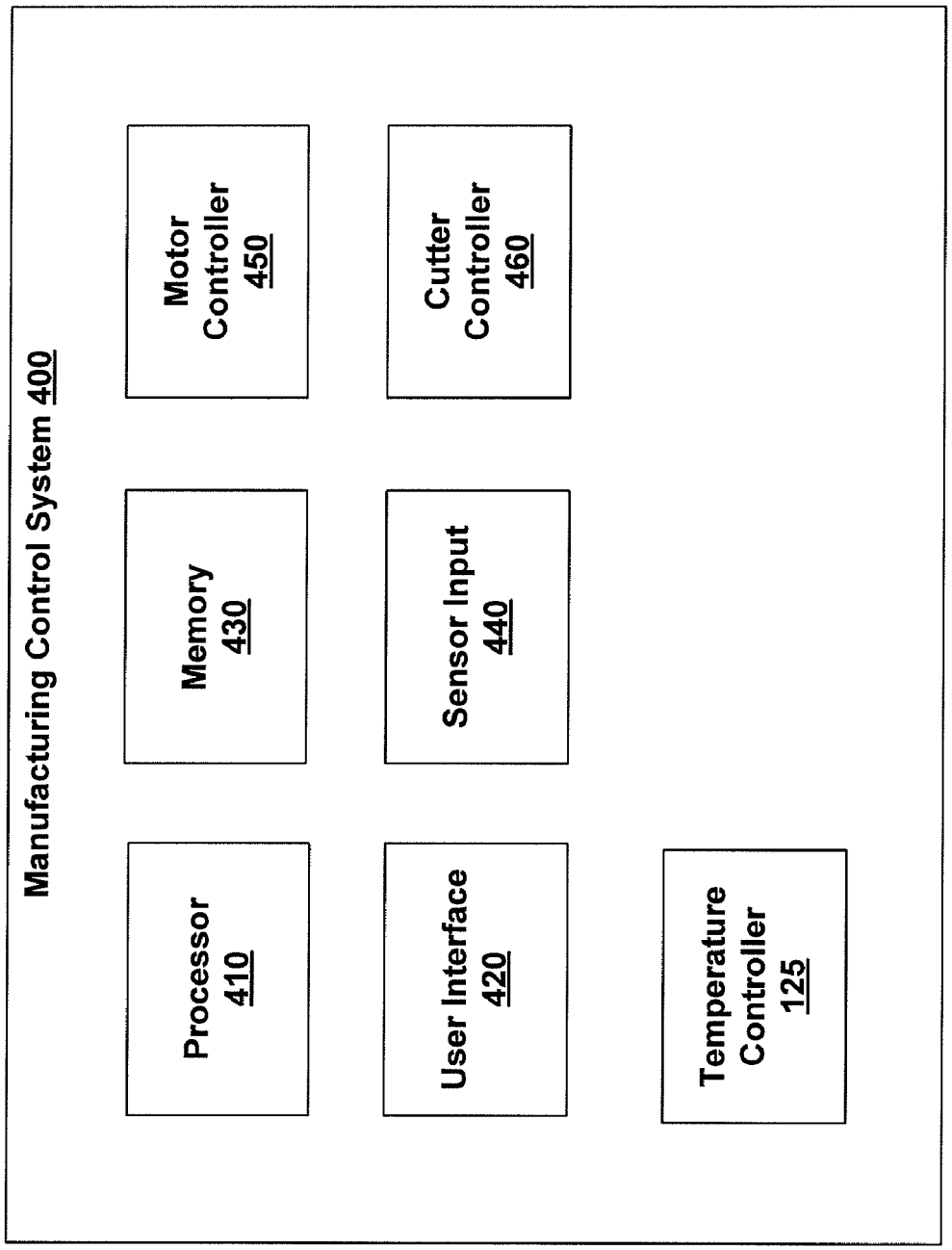
FIG. 4 illustrates a manufacturing control system, according to various embodiments of the invention.

FIG. 4 illustrates a Manufacturing Control System 400 configured to control Material Manufacturing System 100, according to various embodiments of the invention. Manufacturing Control System 400 can be embodied in a single computing device or distributed among several devices. Manufacturing Control System 400 includes at least a Processor 410 and a User Interface 420. Processor 410 can be a logic circuit, a microprocessor, an integrated circuit, or other device configured to perform logic functions. For example, in some embodiments, Processor 410 is a microprocessor configured to execute computing instructions in the form of firmware of software. User Interface 420 includes controls for a user to operate Manufacturing System 100. For example, User Interface 420 may include a display screen and user inputs.

Manufacturing Control System 400 optionally includes a Memory 430 configured to store operating conditions. For example, a recipe including times, temperatures, separation materials and processing rates for achieving a particular recycled output may be stored in Memory 430 for access by Processor 410.

Manufacturing Control System 400 optionally includes a Sensor Input 440 configured to receive input from Sensor 155. Sensor Input 440 is used to make the output of Sensor 155 available to Processor 410. Manufacturing Control System 400 optionally includes a Motor Controller 450 configured to control Drive Motor 135 or Drive Motor 380 responsive to instructions received from Processor 410. Motor Controller 450 is optionally also configured to control movement of First Feeder 115, Second Feeder 170, and/or Loader 360. For example, Motor Controller 450 may be configured to control placement of plastic bags or spreading plastic bags out prior to fusing.

Manufacturing Control System 400 optionally includes a Cutter Controller 460 configured to control Cutter 163. In some embodiments, Cutter Controller 460 is configured to operate Cutter 163 responsive to information received via Sensor Input 440. For example, if an unwanted symbol (e.g., trademark) is found in the recycled bags by Sensor 155, then Cutter Controller 460 may be used to cut out this symbol. In some embodiments, Cutter Controller 460 is configured to cut the symbols or patterns discussed elsewhere herein into the plastic bags or the recycled output.

FIG. 5 illustrates exemplary patterns within a recycled output, according to various embodiments of the invention. These patterns may be orientated in any direction with respect to the output. The patterns include diagonal lines, vertical/horizontal lines, squares, ovals, logos, trademarks, numbers, letters, symbols, images, graphics, and/or the like. As is described elsewhere herein, there are several methods by which these patterns can be produced according to various embodiments of the invention. These methods include, but are not limited to the use of different temperature profiles, cutting of recycled output or plastic bags, or use of different separation materials. One of ordinary skill in the art will understand that a wide variety of patterns may be generated.

Figure 6:
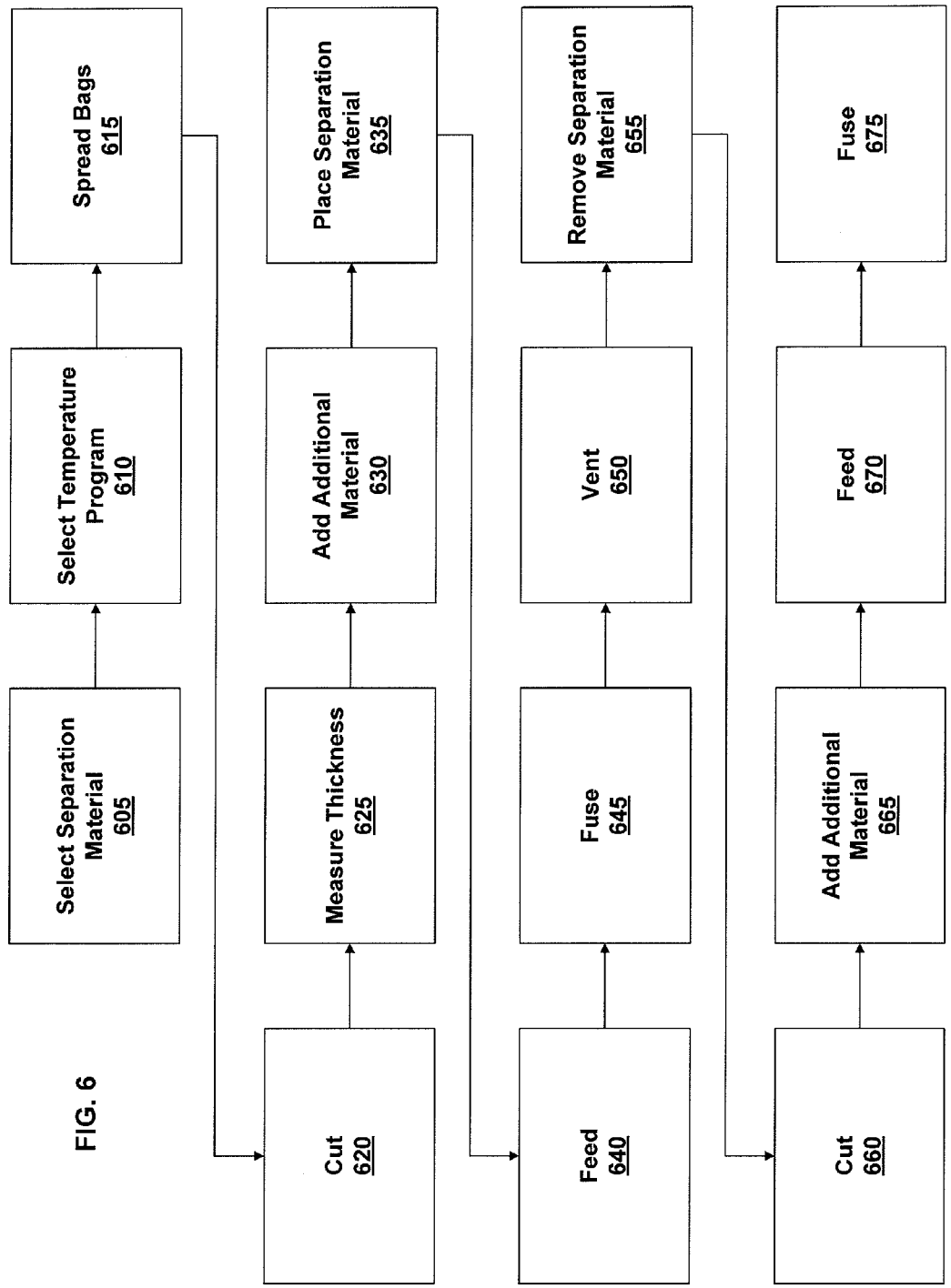
FIG. 6 illustrates a method of manufacturing a recycled output, according to various embodiments of the invention.

FIG. 6 illustrates methods of manufacturing a recycled output, according to various embodiments of the invention. In these methods, plastic, such as discarded plastic bags, is used to generate a recycled output. The recycled output is optionally a fabric. The methods illustrated by FIG. 6 are optionally performed using Material Manufacturing System 100.

In an optional Select Separation Material Step 605, a separation material is selected for use in making a recycled output. The separation material can be selected to generate a desired texture in the recycled output. In some embodiments, the selected separation material includes more than one material type for use on different or the same sides of the recycled output. When more than one type of separation material is selected, the selected separation material is optionally configured (e.g., arranged) to generate a desired pattern. Select Separation Material Step 650 is optional in embodiments wherein a separation material is not used and in embodiments wherein only one separation material is available.

In an optional Select Temperature Program Step 610, a temperature program is selected for use in making the recycled output. The selected temperature program can include temperatures at which to set rollers during the fusing process. For example, a temperature program may specify that a first instance of Roller 130 is held at a first temperature and a second instance of Roller 130 is held at a second same or different temperature. As is discussed elsewhere herein, the temperature of a recycled output can also be controlled by removing separation material at selected times. As such, Select Temperature Program Step 610 can include determining when to remove separation material from the recycled output. In some embodiments, Select Temperature Program Step 610 includes selecting operation conditions for Heater 225 and/or Heater 140. Select Temperature Program Step 610 is optional in embodiments wherein the same temperatures are used each time a recycled output is produced.

In a Spread Bags Step 615, plastic bags are spread out in multiple layers over an area such as Conveyor 145. The plastic bags may be spread out using one or more Material Source 150. For example, in some embodiments, Material Source 150 includes brushes that are used to spread out plastic bags.

In an optional Cut Step 620, the spread out plastic bags are cut. The cutting is optionally configured to create patterns in the recycled output. For example, shapes can be cut in colored plastic bags to create patterns in the recycled output. The cutting is optionally configured to remove unwanted symbols. In some embodiments, the cutting includes shredding some or all of the plastic bags. In some embodiments, Cut Step 620 includes sorting bags into groups according to plastic type, color, symbols, source, or the like, and cutting one group but not an other group.

In an optional Measure Thickness Step 625, Sensor 155 is used to measure a thickness of the plastic bags prior to fusing. The thickness may be measured ultrasonically, measuring light transmission, using adsorption spectroscopy, or the like. Some embodiments require a minimum number of layers of plastic, e.g., 4, 5, 6, 8, 10, 14, 18 or 22 layers. In an optional Add Additional Material Step 630, further plastic bags may be added if it is found that a minimum number of layers is lacking.

In optional Additional material Step 630, additional material other than the plastic bags is optionally added to the spread plastic bags using Material Source 150. As is discussed elsewhere herein, this added material can include a wide variety of non-plastic. In some embodiments, the added material is placed to form a pattern. For example, glitter may be distributed so as to spell out a word.

In a Place Separation Material Step 635, separation material is placed on one or both sides of the plastic bags such that the separation material will be between the separation material and a roller or press during fusing of the plastic bags. The placed separation material is optionally that selected in Select Separation Material Step 650. Part or all of Place Separation Material Step 635 may be performed prior to Spread Bags Step 615 or following a Feed Step 640 discussed elsewhere herein.

In Feed Step 640, the spread plastic bags are feed into a first roller set. Feed Step 640 is optionally accomplished using a mechanical feeder. In various embodiments, Feed Step 640 includes feeding the plastic bags into the first roller at a rate of at least 0.5, 1.0, 2.0, 2.5, or 4.0 meters per minute. This feed rate is optionally determined in Select Temperature Program Step 610. In some embodiments, a greater feeding rate is possible by including more than two of Rollers 130 in First Roller Set 110 and/or Second Roller Set 165.

In Fuse Step 645, the plastic bags are fused using the first roller set to generate a recycled output (e.g., fabric) while maintaining at least part of the plastic bags at a temperature below a melting temperature of the plastic bags. Typically, each layer of the plastic bags melts (e.g., flows into adjacent layers) to at least some extent during the fusing process.

In an optional Vent Step 650, Vent 160 is used to remove air from the vicinity of the first roller set. For example, Vent Step 650 can include removal of any vapors discharged by the recycled plastic bags during the fusing process. Vent Step 650 is optionally performed on a continuous basis.

In a Remove Separation Material Step 655, the separation material is removed from the recycling output, e.g., from the fused plastic bags. As discussed elsewhere herein, the removal of separation material may be timed so as to control a texture and/or pattern of the recycling output. Removal may occur at different times on different places and/or sides of the recycling output.

In an optional Cut Step 660, the recycling output is cut using Cutter 163. This cutting can be to trim the recycling output and/or to create patterns in the recycling output.

In an optional Add Additional Material Step 665, additional material is added to the recycling output. As is discussed elsewhere herein, this additional material can include more plastic bags, plastic of a different type, virgin plastic, plastic in a different form, other recycled output, and/or non-plastic material. In some embodiments, the added material is placed to form a pattern.

In an optional Feed Step 670, the recycled output and any additional material added in Add Additional Material Step 665 are feed into a second roller set, such as Second Roller Set 165.

In an optional Fuse Step 675, the feed materials are fused together. Fuse Step 675 is similar to Fuse Step 645.

In alternative embodiments, the methods illustrated by FIG. 6 are optionally performed using the embodiments of Material Manufacturing System 100 illustrated in FIG. 3. In these embodiments, Press 300 is used in place of First Roller Set 110 and/or Second Roller Set 165. For example, in some embodiments, First Roller Set 110 is first used to generate a recycled output and this recycled output is then further processed using Press 300.

Figure 7:
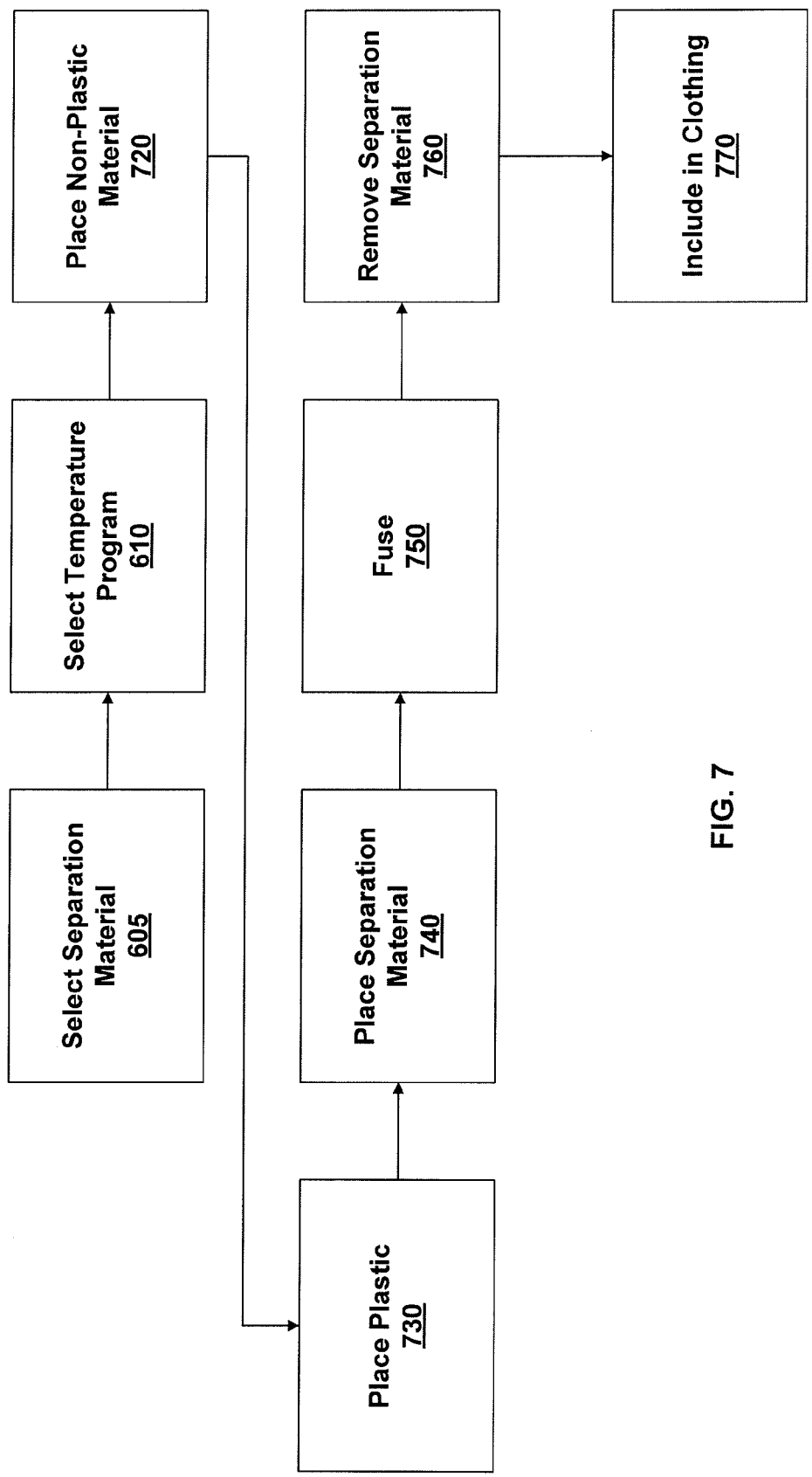
FIG. 7 illustrates an alternative method of manufacturing a recycled output, according to various embodiments of the invention.

FIG. 7 illustrates an alternative method of manufacturing an output, according to various embodiments of the invention. In the method illustrated by FIG. 7, a non-plastic material is modified by the addition of new or recycled plastic, such as that from discarded plastic bags. The non-plastic material is modified by fusing the plastic to the non-plastic. The plastic alters a texture of the non-plastic. This altered texture is optionally used to create a pattern. In some embodiments, the output generated using the method of FIG. 7 does not include recycled materials. The method of FIG. 7 is optionally performed using the various embodiments of Material Manufacturing System 100 discussed elsewhere herein.

The method of FIG. 7 starts with optional Select Separation Material Step 605 and optional Select Temperature Program Step 610. These steps are performed in a manner similar to that described elsewhere herein.

In a Place Non-plastic Material Step 720, a non-plastic material is placed within Material Manufacturing System 100 or the like. The non-plastic material optionally includes a cloth comprising, for example, cotton, silk, wool, nylon, polyester, rayon, and/or the like. In some embodiments, the cloth is included in a piece of clothing prior to Place Non-plastic Material step 720.

In a Place Plastic Step 730, plastic is placed on the non-plastic material. This plastic is optionally reclaimed plastic, e.g. used plastic, manufacturing rejects, or waste plastic from some other process. In some embodiments, the plastic includes plastic bags such as those discussed elsewhere herein. The plastic is optionally cut into a pattern prior to placement. This cutting can be performed using a device similar to Cutter 163.

In an optional Place Separation Material Step 740, a separation material is placed on top of the plastic. This separation material is optionally a separation material selected in Select Separation Material Step 605. Place Separation Material Step 740 is optionally similar to Place Separation Material Step 635 of FIG. 6.

In a Fuse Step 750, the plastic is fused to the non-plastic material using, for example, First Roller Set 110 or Press 300. The fusing is performed so as to change a texture of the non-plastic material. For example, if the plastic is fused to the non-plastic material while the plastic is hot and the plastic then shrinks while cooling this will cause a curving of the non-plastic material. Optionally, the plastic is disposed on the non-plastic material such that the change in texture results in a pattern. For example, if the non-plastic material is part of a cotton shirt and the plastic is in the form of elongated strips, then the fusing process can result in elongated variations in texture on the cotton shirt. The plastic can be placed on an inside surface or outside surface of the shirt. When placed on the inside surface of the shirt, the plastic is not visible but the variation in texture is visible when the shirt is worn. When placed on the outside surface of the shirt, the plastic is visible when the shirt is worn.

In an optional Remove Separation Material Step 760, the separation material placed in Place Separation Material Step is removed. Remove Separation Material Step 760 is similar to Remove Separation Material Step 655 of FIG. 6.

In an optional Include in Clothing Step 770, the cloth is included in a piece of clothing. This clothing may includes a hat, shirt, neck tie, scarf, pant, jacket, coat, cape, dress, skirt, legging sock, shoe, or the like. Include in Clothing Step 770 may occur prior to one or more other steps shown in FIG. 7.

Figure 8:
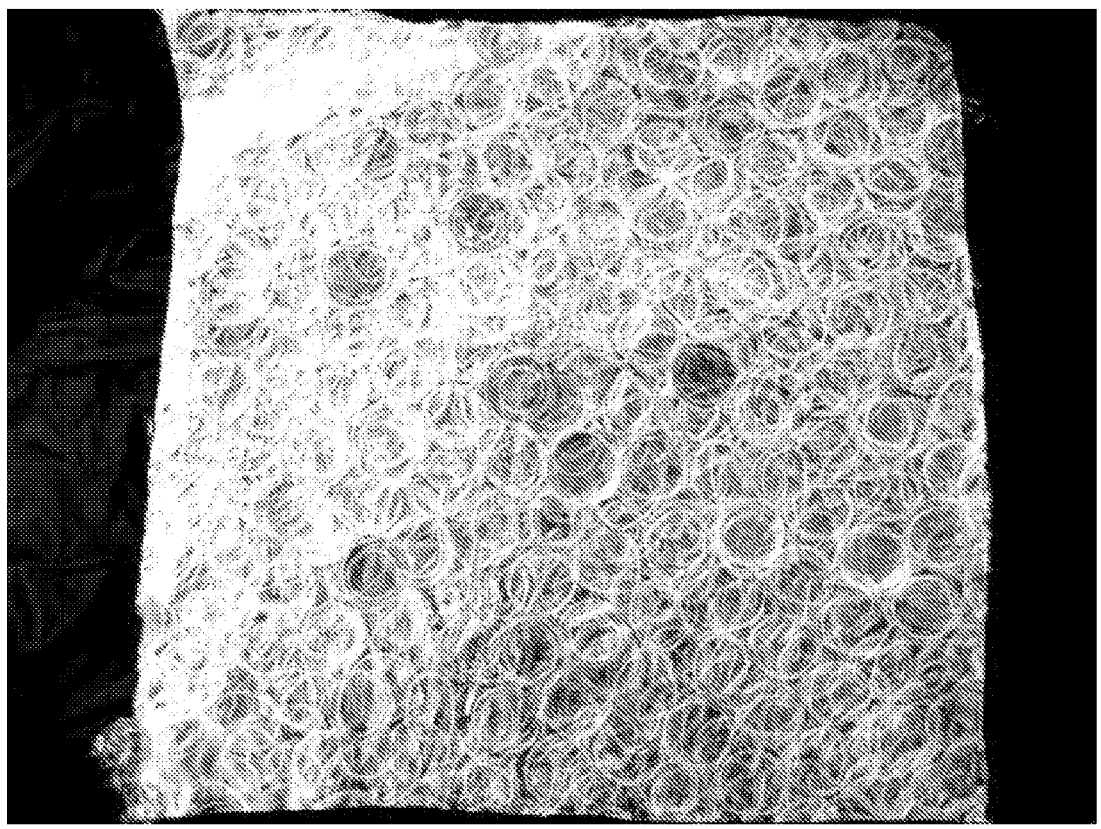
FIG. 8 illustrates a fabric comprising recycled bubble wrap, according to various embodiments of the invention.

FIG. 8 illustrates a fabric comprising recycled bubble wrap, according to various embodiments of the invention. This example is created using three layers of bubble wrap and Press 300. By placing the bubbles toward the heated surface, the bubbles pop and relatively few air pockets are produced. By placing the bubbles away from the heated surface, fewer bubbles pop and the resulting trapped air gives a rougher texture.

Figure 9:
FIG. 9 illustrates a fabric comprising a non-plastic material fused to recycled plastic configured to form a pattern, according to various embodiments of the invention.

FIG. 9 illustrates a fabric comprising a non-plastic material fused to recycled plastic configured to form a pattern, according to various embodiments of the invention. In this example, the non-plastic material includes a cotton shirt and the recycled plastic is cut into a maple leaf shape.

Figure 10:
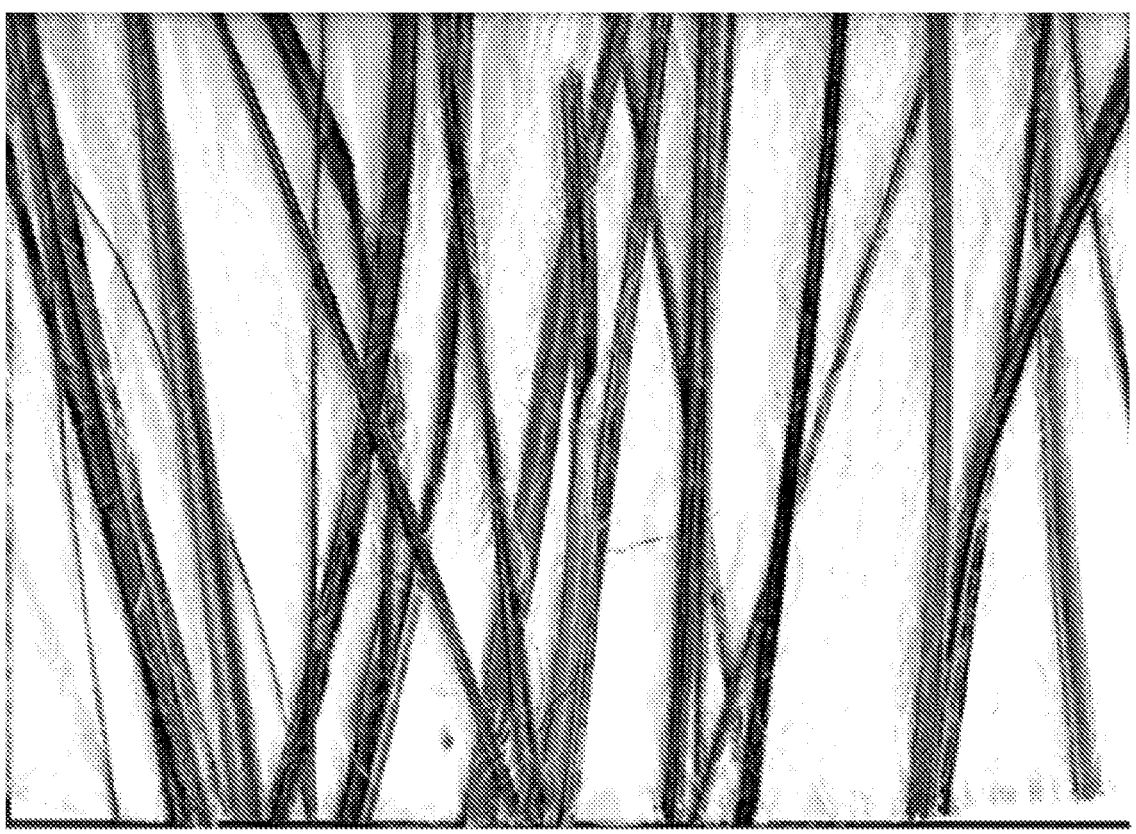
FIG. 10 illustrates a fabric including a non-plastic material, according to various embodiments of the invention.

FIG. 10 illustrates a fabric including a non-plastic material, according to various embodiments of the invention. In this example, the non-plastic material includes plant stalks embedded between fused layers of recycled plastic bags.

Figure 11:
FIG. 11 illustrates a non-plastic material given a pattern by fusing with recycled plastic, according to various embodiments of the invention.

FIG. 11 illustrates a non-plastic material given a pattern by fusing with recycled plastic, according to various embodiments of the invention. In this example, a cotton fabric is given curvature by the attachment of recycled plastic shaped as maple leaves. The amount of curvature can be controlled by varying the thickness of the plastic. Thicker plastic results in greater curvature.

Figure 12A:
FIGS. 12A and 12B illustrate a non-plastic material given a texture by fusing with recycled plastic on a back side, according to various embodiments of the invention.
Figure 12B:
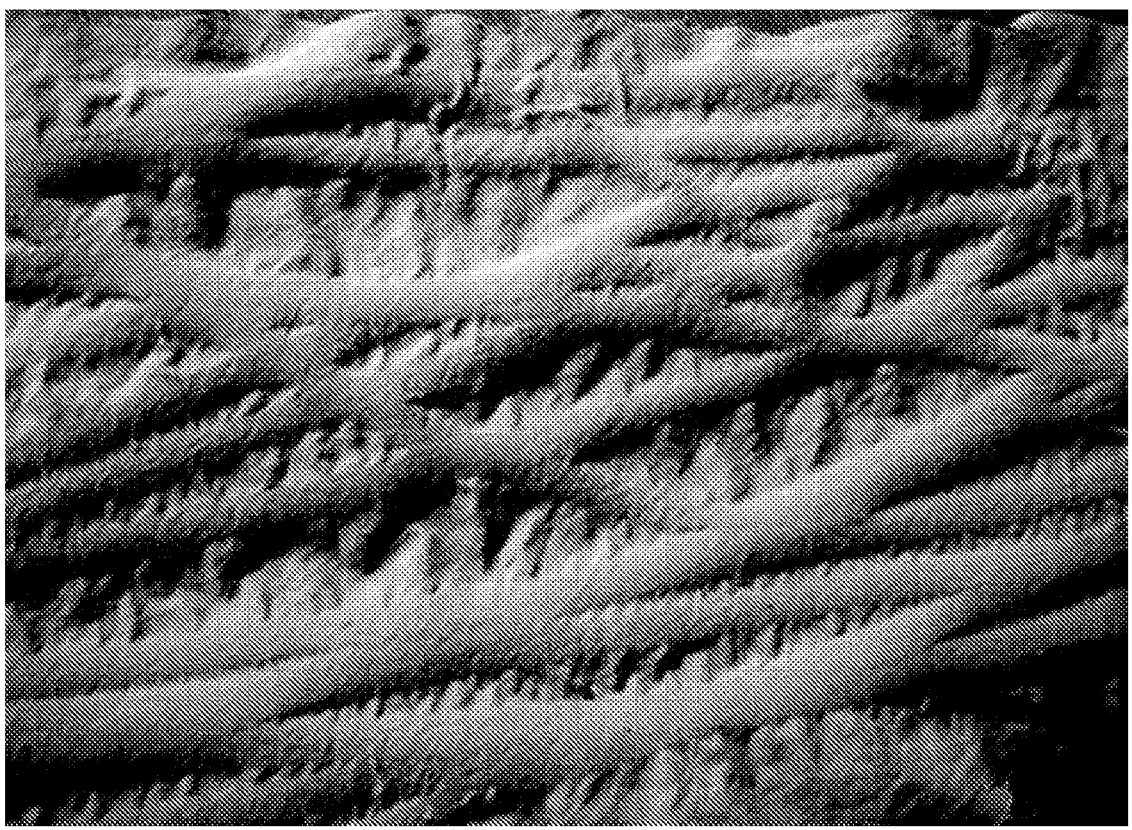

FIGS. 12A and 12B illustrate a non-plastic material given a texture by fusing with recycled plastic on a back side of a piece of clothing, according to various embodiments of the invention. In this example, strips of recycled plastic were fused to the inside of a tee shirt. The plastic is not visible when the shirt is worn. However, the resulting texture is visible through the shirt. Thicker and thinner strips of recycled plastic were used to generate different amounts of curvature. FIG. 12B includes a close up of part of the tee shirt shown in FIG. 12A.

FIG. 13 is a block diagram of a fabric including regions of different thickness, according to various embodiments of the invention. In these embodiments, two stiffer Regions 1310 are separated by less stiff Region 1320 including a Hinge 1330. The stiffer Regions 1310 my differ from the less stiff Region 1320 in the types of non-plastic materials included, the types of plastics included, or the number of layers of plastics included. For example, Regions 1310 my have a higher ratio of HDPE to LDPE relative to Region 1320. Sharp boundaries between regions are optionally achieved by cutting the plastic.

Figure 14:
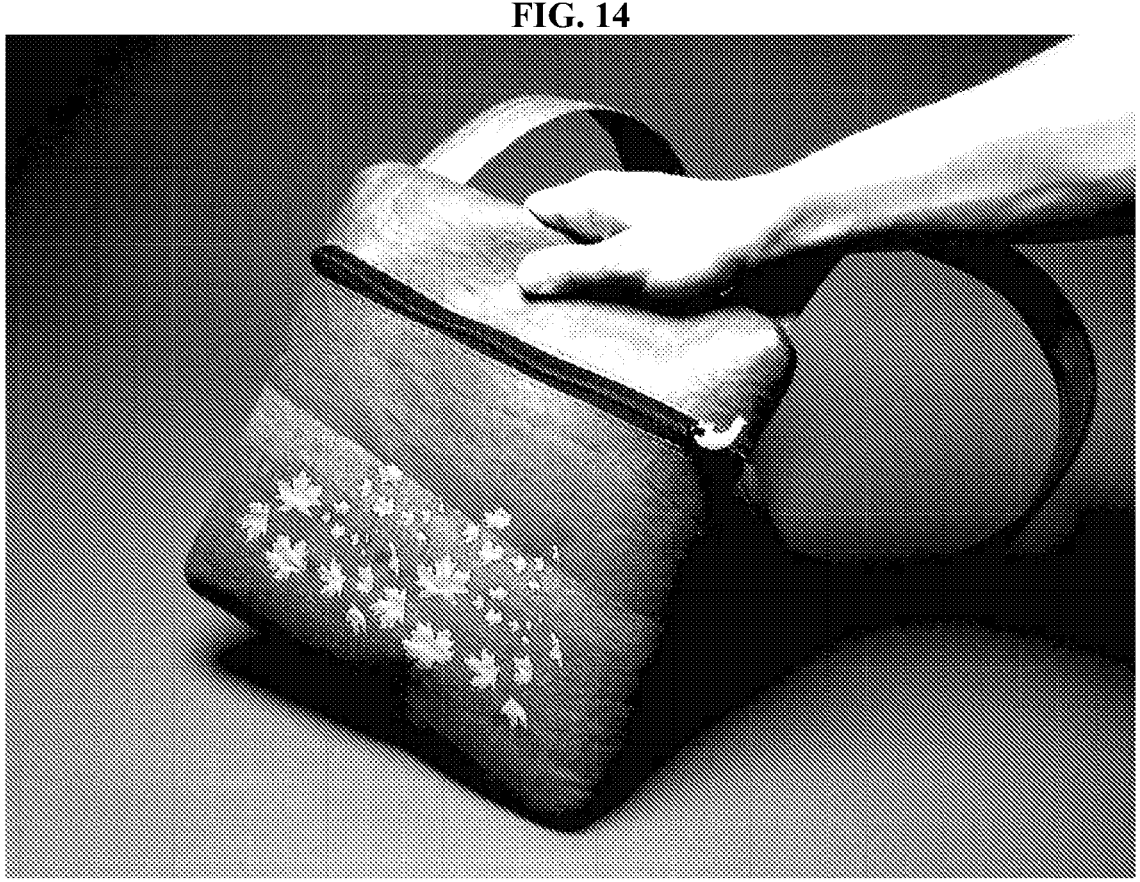
FIG. 14 illustrates a fabric configured as a bag and including a pattern generated by cutting recycled bags, according to various embodiments of the invention.

FIG. 14 illustrates a fabric configured as a bag and including a pattern generated by cutting recycled bags, according to various embodiments of the invention. The pattern includes a plurality of leaves having a distinctly different color than the remainder of the bag. The bag illustrated in FIG. 14 is also "seamless." Where seams would normally have appeared in a bag of the prior art, adjacent recycled fabrics were fused together using an ultrasonic weld. This produces a connection that is substantially indistinguishable from the bulk material.

Several embodiments are specifically illustrated and/or described herein. However, it will be appreciated that modifications and variations are covered by the above teachings and within the scope of the appended claims without departing from the spirit and intended scope thereof. For example, while many of the examples herein include the use of plastic bags, other types of reclaimed or new plastic may be used. In some embodiments, heated rollers or a heated press are replaced by an oven in which an entire environment of the plastic is heated. In these embodiments, the rollers and press do not need to include heaters themselves. In some embodiments, ink is added to the plastic prior to or after fusing. This ink or paint is optionally used to form a pattern or to change a color of the plastic. For example, an image or symbol can be printed on the plastic bags.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a first roller set configured to receive plastic bags and to fuse the plastic bags into a recycled fabric while keeping at least part of the plastic bags below a melting temperature of the plastic bags;
   a first feeder configured to receive the plastic bags and to feed the plastic bags into the first roller set and comprising a bag cutting device configured to cut a pattern in the plastic bag; and
   a controller configured to control a temperature or pressure of the first roller set.

2. A system comprising:
   a first roller set configured to receive plastic bags and to fuse the plastic bags into a recycled fabric while keeping at least part of the plastic bags below a melting temperature of the plastic bags;
   a first feeder configured to receive the plastic bags and to feed the plastic bags into the first roller set;
   a controller configured to control a temperature or pressure of the first roller set; and
   a bag cutting device configured to shred the plastic bags.

3. A system comprising:
   a first roller set configured to receive plastic bags and to fuse the plastic bags into a recycled fabric while keeping at least part of the plastic bags below a melting temperature of the plastic bags;
   a first feeder configured to receive the plastic bags and to feed the plastic bags into the first roller set and comprising a thickness sensor configured to determine a number of layers of plastic bags on the first feeder; and
   a controller configured to control a temperature or pressure of the first roller.

4. The system of claim 2, wherein the first roller set is configured to fuse the plastic bags at a roller temperature between approximately 205 and 220 degrees Celsius.

5. The system of claim 2, wherein the first roller set includes a first roller having a first temperature and a second roller having a second temperature, the first temperature and the second temperature being within 30 degrees Celsius of each other.

6. The system of claim 1, wherein the first roller set is configured to generate a repeated textural pattern in the recycled fabric.

7. The system of claim 2, wherein the first roller set comprises a separation material configured to determine a texture of the recycled fabric.

8. The system of claim 3, wherein the first feeder is configured to arrange the plastic bags.

9. The system of claim 2, further including a separation material configured for separating the plastic bags from a roller of the first roller set.

10. The system of claim 9, wherein the first roller set is further configured such that the separation material is feed into the first roller set more than one time.

11. The system of claim 1, further comprising a second roller set including a heater and configured to receive the recycled fabric after processing by the first roller set.

12. The system of claim 2, further including a vent configured to remove volatile organic compounds from a volume around the first roller set.

13. The system of claim 2, wherein the first roller set includes at least three heated rollers.

14. The system of claim 1, further including a suction device configured for holding the plastic bags on the first feeder.

15. The system of claim 1, wherein the first roller set is configured to fuse the plastic bags at a roller temperature between approximately 205 and 220 degrees Celsius.

16. The system of claim 1, wherein the first roller set includes a first roller having a first temperature and a second roller having a second temperature, the first temperature and the second temperature being within 30 degrees Celsius of each other.

17. The system of claim 3, wherein the first roller set is configured to fuse the plastic bags at a roller temperature between approximately 205 and 220 degrees Celsius.

18. The system of claim 3, wherein the first roller set comprises a separation material configured to determine a texture of the recycled fabric.

19. The system of claim 3, further including a separation material configured for separating the plastic bags from a roller of the first roller set.

20. The system of claim 2, further including a suction device configured for holding the plastic bags on the first feeder.

* * * * *